UNITED STATES PATENT OFFICE.

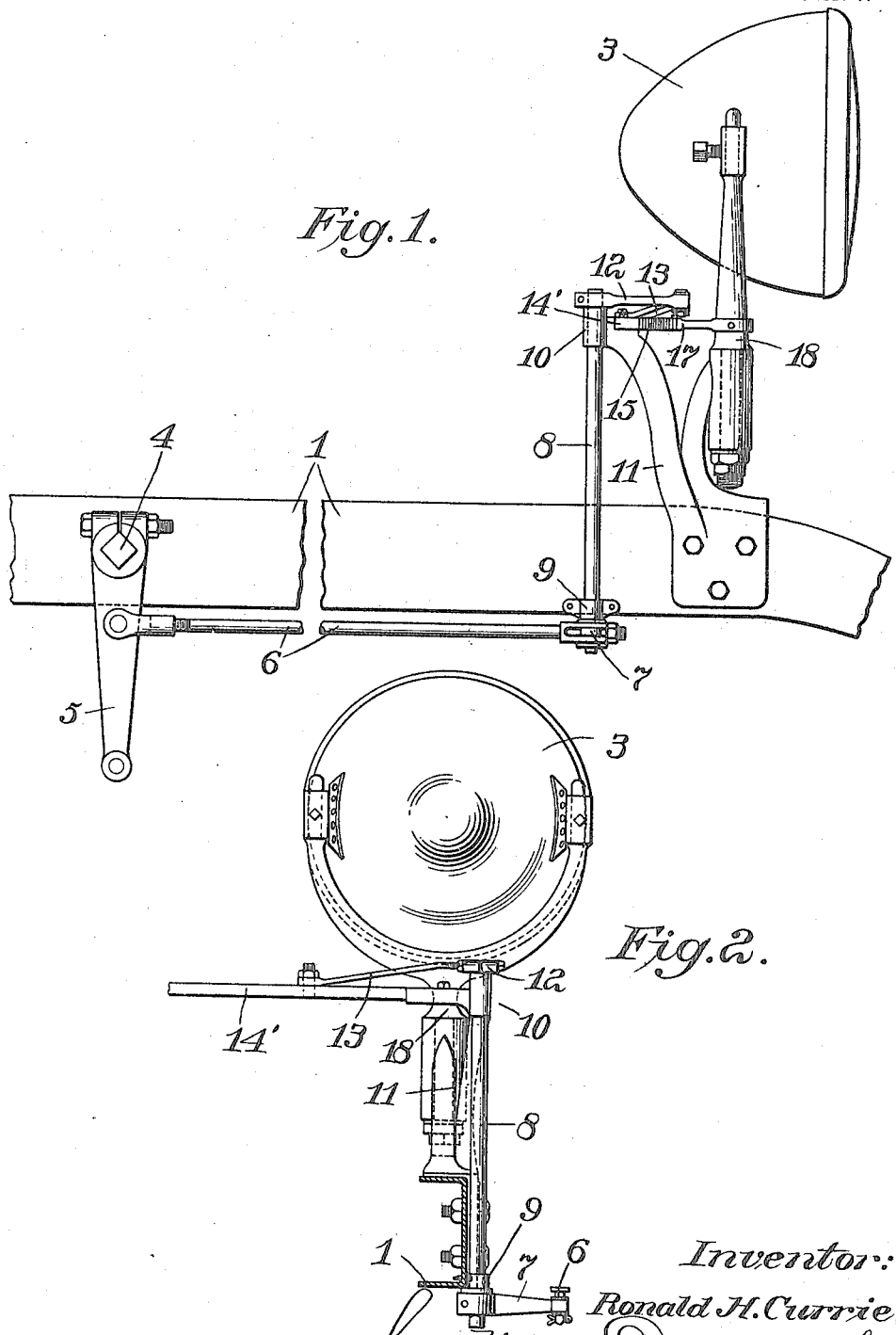

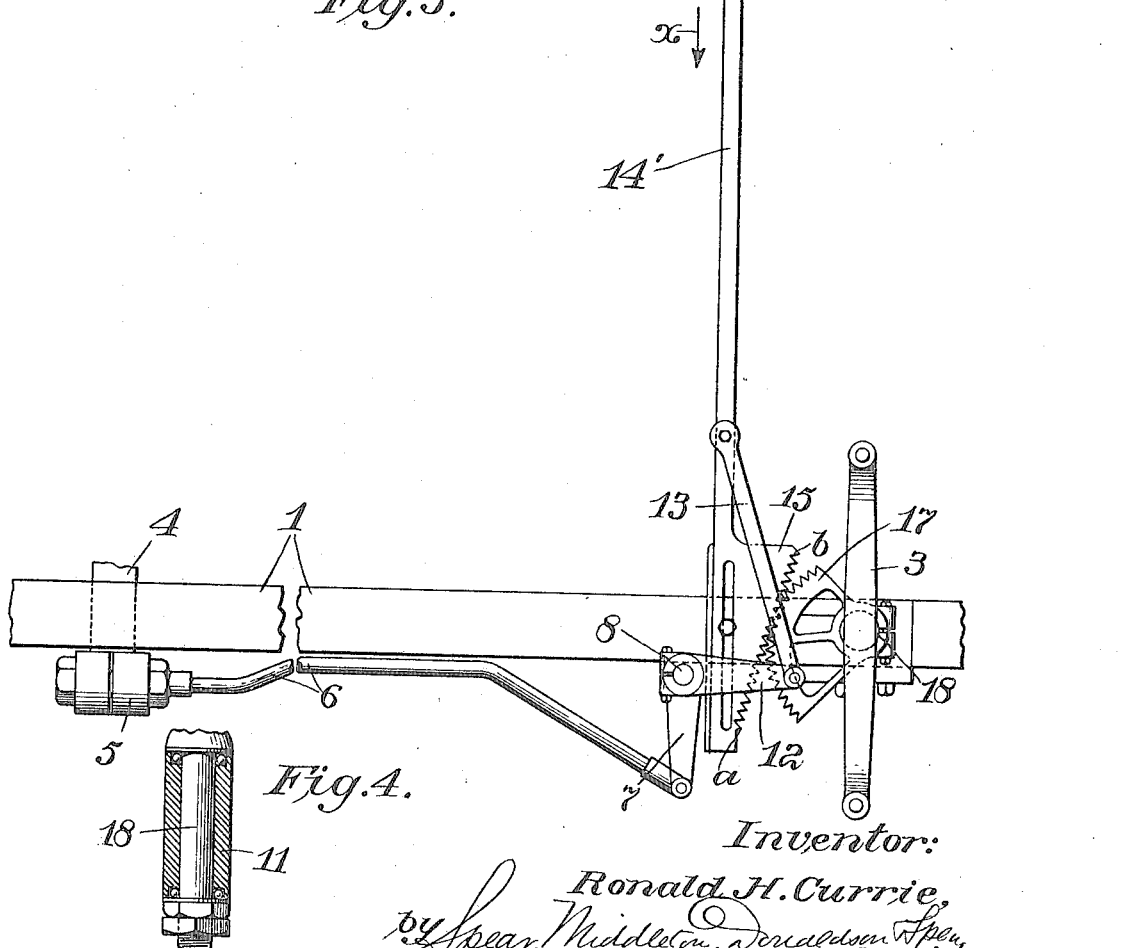

RONALD HUGH CURRIE, OF CALGARY, ALBERTA, CANADA.

DIRIGIBLE HEADLIGHT.

1,206,418. Specification of Letters Patent. Patented Nov. 28, 1916.

Application filed May 25, 1916. Serial No. 99,898.

*To all whom it may concern:*

Be it known that I, RONALD H. CURRIE, a British citizen, and resident of Calgary, Alberta, Canada, have invented certain new and useful Improvements in Dirigible Headlights, of which the following is a specification.

The invention is designed to adjust the headlights of automobiles to concentrate the rays of light from the pair of lamps, at the point toward which the automobile is directed at any period of its turning movement. Thus in turning a curve the lamp at the inner side of the curve will be adjusted at one angle to the car while the lamp at the outer side of the curve will be adjusted at a greater angle to the car to make its rays converge substantially with those of the other lamp at the point corresponding to that for which the steering wheels are set, and it will be understood that as the deflection from a straight course varies in degree so the angular adjustment of the lamps will vary in degree, the result being that the light rays at any particular moment will be directed to the point toward which the car is traveling at that moment.

The invention consists in the features and combination and arrangement of parts hereinafter described and particularly pointed out in the appended claims.

In the drawings: Figure 1 is a side view of the apparatus with only so much of the frame of a car as will illustrate its manner of assemblage in connection therewith. Fig. 2 is a rear view of one of the lamps and associated connections, showing also a part of the frame of the car in section. Fig. 3 is a plan view of the invention. Fig. 4 is a detail of a ball bearing.

In these drawings 1 indicates a part of the frame of the car, 2 and 3 the lamps and 4 the shaft to which the steering post is connected by gearing, and from which connection is made to the stub axles of the front wheel by a wiper arm 5. While the lamps may be adjusted through various connections, in the embodiment of my invention which I have chosen to illustrate my invention I utilize this wiper arm as the means for actuating the lamp adjusting connections. For this purpose a rod 6 extends from this wiper arm and at its front end it is connected with an arm 7, on a vertical rock shaft 8, suitably journaled in a bearing 9 on the frame and an upper bearing 10 on the bracket 11 bolted to the machine frame. At the upper end of this vertical rock shaft an arm 12 is secured, connected by a link 13 with a bar 14' which extends transversely of the frame of the car, said bar having at its ends means for imparting differential angular movement to the lamps through elements now to be referred to. This means at the ends of the bar in the particular form of my invention illustrated, consists of rack bars or plates 14, 15, having their teeth disposed in planes inclined to the line of movement of the bar 14' and inclined reversely in respect to each other.

The rack bars or plates may be said to have high and low points *a* and *b* and it will be observed that the low points *a* are at the outer ends of the rack bars, while the high points *b* are at the inner ends of said bars. These rack bars mesh with eccentric gears or segments 16, 17 mounted on vertical posts 18 suitably journaled in arms of the bracket 11, the said posts having ball bearings, as shown in Fig. 4 and when the posts are turned the lamps which are supported thereon will be turned also.

It will be observed that the high parts of the segmental or eccentric gears are opposite the low parts of the racks and conversely their low parts or those nearest the center are opposite the high parts of the racks and therefore these eccentrics in respect to each other are in reversed positions. Now when the steering post of the car is turned to change the direction of the car, say to the left, the rack bars will be moved from their neutral position, shown in Fig. 3, in the direction of the arrow *x* and both of the lamps will be turned, to direct their rays leftward or in the direction in which the front wheels are turned. The segment 16 however, which is the one on the inner side of the curve being made by the car will be turned to a lesser extent than the other lamp segment 17, which is at the outer side of the curve, this differential angular movement of the segments being due to the fact that while both racks move equal distances, the movement of the rack 14 is transmitted through the teeth of the segment 16 at successively larger radii, while the rack 15 transmits its linear movement through teeth at successively shorter radii of its gear. The differential angular positions assumed by the lamps as a result of these actions is such that the light rays from the lamps will be concentrated at a point in advance of the car toward which it is directed at the moment and this angular relation changes in consonance with the angular position of the front wheels in relation to the car. By my invention I concentrate the light from the two lamps at all the various turning angles and at a point toward which the car is moving. The rack bars slide on machined surfaces at the top of the bracket 11.

The apparatus has been devised with a view to avoiding detracting from the appearance of the car and for securing durability in use.

What I claim is:—

1. In combination with a pair of automobile lamps mounted to turn about a vertical axis, means for connecting said lamps to the steering mechanism, said means consisting of a transverse bar having incline racks, for turning them differentially in respect to each other to concentrate the light substantially at the point or points toward which the car is moving in making turns, substantially as described.

2. In combination with a car, a pair of lamps turnable into angular positions about vertical axis, and means for connecting said lamps to the steering mechanism of the car, said means consisting of a transverse bar having incline racks for turning the lamp at the inside curve to less angular degrees than the lamp at the outside of the curve is turned, substantially as described.

3. In combination with a pair of lamps for an automobile, each mounted to turn about a vertical axis, eccentric gears on the axes of said lamps reversed in position in relation to each other, and rack bars to engage said eccentric gears lying in inclined position with respect to their line of movement and reversed in respect to each other, substantially as described.

4. In combination with a pair of automobile lamps, each turnable about a vertical axis, eccentric gears on the rotary posts of said lamps and a bar extending transversely across the machine and having incline rack teeth to engage the said gears and a connection for operating the rack bar from the steering gear of the machine, substantially as described.

5. In combination with a pair of automobile lamps mounted on vertical posts which are turnable, eccentric gears mounted on said posts with their low parts toward the inside of the machine, rack bars inclined to their line of transverse movement across the machine and having their low parts opposite the high parts of the eccentric gears and means for operating the rack bars from the steering mechanism, substantially as described.

In testimony whereof, I have affixed my signature.

RONALD HUGH CURRIE.

Witness:
LLOYD H. FENERTY.

Copies of this patent may be obtained for five cents each, by addressing the "Commissioner of Patents, Washington, D. C."